United States Patent [19]

Nuckolls et al.

[11] Patent Number: 4,763,044
[45] Date of Patent: Aug. 9, 1988

[54] START, HOT RESTART AND OPERATING LAMP CIRCUIT

[75] Inventors: Joe A. Nuckolls, Blacksburg; Isaac L. Flory, IV, Harrisonburg, both of Va.

[73] Assignee: Hubbell Incorporated, Orange, Conn.

[21] Appl. No.: 35,243

[22] Filed: Apr. 6, 1987

Related U.S. Application Data

[63] Continuation-in-part of Ser. No. 821,804, Jan. 23, 1986, abandoned.

[51] Int. Cl.$^4$ .................. H05B 41/26; H01J 61/96
[52] U.S. Cl. ........................ 315/176; 315/174; 315/119; 315/225; 315/360; 315/276; 315/287; 315/289; 315/DIG. 7
[58] Field of Search ............... 315/DIG. 7, 289, 290, 315/171, 172, 173, 175, 119, 209 R, 225, 226, 276, 287, 360

[56] References Cited

U.S. PATENT DOCUMENTS

| | | | |
|---|---|---|---|
| 3,189,790 | 6/1965 | Nuckolls | 315/289 |
| 3,317,789 | 5/1967 | Nuckolls | 315/194 |
| 3,328,673 | 4/1967 | Nuckolls | 323/21 |
| 3,334,270 | 8/1967 | Nuckolls | 315/171 |
| 3,500,128 | 3/1970 | Leipins | 315/278 |
| 3,675,078 | 7/1972 | Levy | 315/289 |
| 3,699,385 | 10/1972 | Paget | 315/239 |
| 3,732,460 | 5/1973 | Wattenbach | 315/123 |
| 3,917,976 | 11/1975 | Nuckolls | 315/258 |
| 3,922,584 | 11/1975 | Strowe | 315/171 |
| 3,963,958 | 6/1976 | Nuckolls | 315/276 |
| 4,012,663 | 3/1977 | Soileau | 315/151 |
| 4,103,209 | 7/1978 | Elms | 315/207 |
| 4,206,385 | 6/1980 | Wisbey | 315/119 |
| 4,275,337 | 6/1981 | Knoble et al. | 315/289 |
| 4,495,446 | 1/1985 | Brown et al. | 315/206 |

FOREIGN PATENT DOCUMENTS

| | | | |
|---|---|---|---|
| 0124735 | 11/1984 | European Pat. Off. | 315/289 |
| 896371 | 5/1962 | United Kingdom | 315/289 |
| 896370 | 5/1962 | United Kingdom | 315/289 |
| 1095460 | 12/1967 | United Kingdom | 315/289 |
| 1137390 | 12/1968 | United Kingdom | 315/289 |
| 1398383 | 6/1975 | United Kingdom | 315/290 |
| 2066596 | 7/1981 | United Kingdom | 315/205 |
| 2088156 | 6/1982 | United Kingdom | 315/205 |
| 2094573 | 6/1982 | United Kingdom | 315/290 |
| 2106341 | 4/1983 | United Kingdom | 315/289 |
| 2132835 | 11/1984 | United Kingdom | 315/290 |

Primary Examiner—David K. Moore
Assistant Examiner—Mark R. Powell
Attorney, Agent, or Firm—Jerry M. Presson; Walter C. Farley

[57] ABSTRACT

A starting, hot restarting and operating circuit includes a pulse circuit for applying high voltage pulses to an HID lamp for starting or hot restarting. After a set interval of pulses if the lamp has not ignited, the pulse circuit is turned off for a selected inactive interval after which pulses are applied to the lamp again. If ignition does not occur after several active/inactive cycles, the circuit is deactivated until reset by turning the power off and on.

19 Claims, 9 Drawing Sheets

START, HOT RESTART AND OPERATING LAMP CIRCUIT

This application is a Continuation-in-Part of application Ser. No. 821,804 filed Jan. 23, 1986 and now abandoned.

This invention relates to electrical circuits for starting and restarting high intensity discharge (HID) lamps under either cold or hot conditions and for operating the lamps after they are started while maintaining safe operating circumstances.

BACKGROUND OF THE INVENTION

Those familiar with the characteristics of HID lamps are aware of the difficulty encountered when attempting to restart a lamp while it is hot after deionization due to a temporary power line dip or interruption. Without special circuit arrangements, such lamps cannot be restarted, or are at least quite difficult to restart, until the hot, high pressure plasma gases cool down.

Then, when the lamp is cool, the fill gas is ionized by a low voltage and high current, but generates very little light output. The elements gradually heat up and re-evaporate into plasma components which then go into electrical discharge, forcing the lamp to produce the normal amount of light. While the cool-down and re-start sequences are occurring there is no light output produced by the lamp. The length of time can be significant: a high pressure sodium (HPS) lamp typically requires 2–3 minutes to restart in a hot fixture and 1–2 minutes more to warm up. Mercury lamps typically require 4–7 minutes and metal halide 4–15 minutes.

A number of circuits have been developed for the purpose of starting such lamps while they are hot to avoid the absence of light discussed above, and other circuits have been developed which simply wait a predetermined time so that restarting can be accomplished after the lamp has completely cooled. Examples of circuits which attempt to deal with the hot restart problem are found in the following U.S. Pat. Nos.

3,476,977 Hallay
3,732,460 Wattenbach
3,749,968 Jones et al
3,944,876 Helmuth
3,991,344 Tabor
4,048,539 Walker et al
4,103,209 Elms
4,240,009 Paul
4,275,337 Knoble
4,320,325 Anderson
4,339,692 Lasecki et al
4,339,695 Siglock
4,356,433 Linden
4,378,514 Collins
4,382,210 Buhrer
4,399,392 Buhrer
4,403,173 Mayer
4,437,042 Morais et al
4,438,369 Hicks et al
4,455,510 Lesko
4,461,982 Faehnrich
4,464,607 Peil et al
4,495,446 Brown et al
4,506,195 Elms Some circuits which have reached the market are unsuitable because they simply do not work or are not reliable, while others are unsuitable because they are unsafe. These devices apply very high voltage pulses having long base times to the wires, the sockets, the screw-shell base and the lamp structure until the hot lamp restarts, whereupon the high voltage pulses are turned off. This is a potentially dangerous situation since the presence of the high voltage is not visually apparent. Some circuits also continue to apply high voltage pulses after a lamp has failed, a condition which can result in destruction of the lamp and socket as well as presenting a danger to service personnel. Those circuits which supply pulses continuously to a lamp in an effort to hot-restart the lamp can cause the lamp to go into what is called a glow or "latched up" mode. Once the lamp has entered this mode it will never restart. Some such devices have been found to cause internal lamp arcing rather than the anticipated hot restarting, resulting in the destruction of new lamps. It is thus apparent that improvements in this area are needed.

SUMMARY OF THE INVENTION

A primary object of the present invention is to provide a circuit for reliably starting an HID lamp initially and quickly restarting the lamp when it is hot after a power interruption or the like without damage to the lamp, ballast of circuitry and without shortening lamp life.

A further object is to provide such a circuit which does not present safety hazards.

Briefly described, the invention includes a starting and operating circuit for a high intensity discharge lamp comprising the combination of an AC voltage source, first circuit means connected to the voltage source and to the lamp for applying to the lamp a sequence of oscillations having a peak voltage magnitude significantly greater than the normal lamp operating voltage and second circuit means for terminating the high voltage pulse trains after a first predetermined active interval of time if lamp reignition does not occur, for suspending application of high voltage to the lamp for a second predetermined quiet interval of time and for allowing the first circuit means to apply oscillatory energy to the lamp at the end of the quiet interval. A switching device terminates the application of the high voltage oscillations when the lamp completely starts or hot restarts. Third circuit means terminates the application of the high voltage oscillations to the lamp after a predetermined number of active and quiet intervals if the lamp fails to ignite.

In order to impart full understanding of the manner in which these and other objectives are attained in accordance with the invention, particularly advantageous embodiments thereof will be described with reference to the accompanying drawings, which form a part of this specification, and wherein.

DESCRIPTION OF PREFERRED EMBODIMENTS

The circuits of the present invention which will be described herein are arranged so that, when high pressure sodium lighting fixtures are specified for a particular use and are to have instant restart capability, the circuits can be used with, or form a part of, a ballast which will instantly restart the hot sodium lamp after a momentary power outage occurs. Ideally the lamp should restart instantly when the power is restored to the ballast, regardless of the length of the power outage, if the lamp is good. As a practical matter, the longer the lamp has been out as a result of power loss, the longer it will take to return the lamp to full brightness, simply because of the cooling of internal gases which has taken place. Thus, the circuits are designed so that, when power is restored after five seconds, the light output will be at least 90% of the output prior to the outage. When power is restored after a loss of ten seconds duration, the light output will be 75%, and when power is restored after fifteen seconds, the light output should be 50%.

In addition, the instant restart circuitry should continue to function when the supply voltage is reduced as much as 10% below the designed voltage level. The added instant restart circuitry must not cause the lamp operating wattage to be reduced during normal operation more than 10% of what the normal lamp operating wattage would be on the same ballast with the instant restart components removed. The added restart components should not cause the electrical efficiency of the fixture to drop below 80% with the lamp operating within 10% of its rated wattage for lamps rated over 150 watts, or drop below 70% for 150 watt lamps and below.

Figure 1:
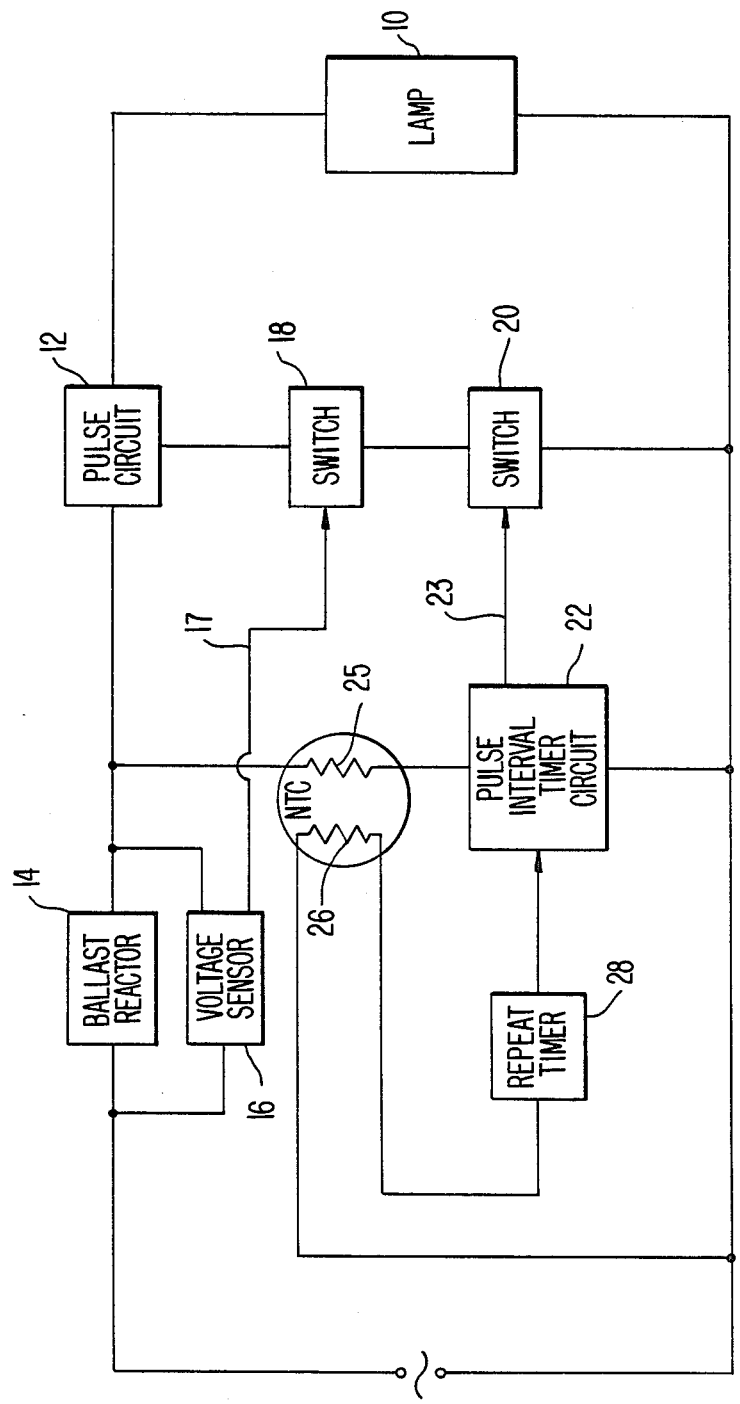
FIG. 1 is a schematic block diagram of a first embodiment of a starting and operating circuit in accordance with the invention.

As shown in FIG. 1, a basic circuit in accordance with the present invention includes a lamp 10 which can be a HPS lamp or other HID lamp, one terminal of the lamp being connected to the output of first oscillatory circuit means in the form of a pulse circuit 12. The pulse circuit is connected to a ballast reactor 14 which is, in turn, connected to a source of AC voltage which, for purposes of the present discussion, will be assumed to be approximately 210 volts AC.

A voltage sensor 16 is connected in parallel with the ballast reactor and is responsive to the voltage across that reactor to produce a control output signal on a conductor 17.

The pulse circuit is also connected to the return line of the AC supply through switches 18 and 20 which are controllable switches, switch 18 being operated by an output 17 from sensor 16. Switch 20 is controlled by an output 23 from second circuit means comprising a pulse interval timer circuit 22. Timer circuit 22 is connected between the load side of the ballast and the return line and, in the embodiment of FIG. 1, is connected in series with a heating resistor 25 between the load side of the ballast reactor and the AC return line. A negative temperature coefficient (NTC) resistor 26 is mounted in good heat transfer relationship with heating resistor 25, resistor 26 being connected between the input of third circuit means comprising a repeat timer circuit 28 and the AC return line. The output of timer 28 is connected to pulse interval timer circuit 22.

The operation of the circuit of FIG. 1 will be described commencing with the condition in which the lamp is operating normally. Switches 18 and 20 can be viewed as normally closed switches. With load current flowing through ballast reactor 14, the voltage drop across the ballast is sufficient to cause voltage sensor 16 to produce an output 17 which opens switch 18. The voltage across timer circuit 22 is insufficient to cause that circuit to operate. Thus, switch 20 is closed. With switch 18 open, pulse circuit 12 is inactive and line current from the AC supply source through the reactor is delivered to the lamp which is producing light in the usual fashion.

When a voltage interruption occurs, lamp 10 is extinguished. When the voltage is restored, the open circuit voltage across ballast reactor 14 is very low because of the absence of current flowing through lamp 10. Thus, voltage sensor 16 produces no output and both of switches 18 and 20 are closed, completing the circuit for the pulse circuit which is thus supplied with a voltage nearly equal to line voltage. Pulse circuit 12 is designed to produce a series of high voltage oscillations which are applied to lamp 10. Under favorable conditions, the first burst of signals from pulse circuit 12 is effective to start conduction through lamp 10, restoring the lamp to operating condition which results in voltage sensor 16 opening switch 18 and returning the circuit to the operating condition described above. However, if that first burst of oscillations does not hot restart lamp 10, it is desirable to impose a "dead" or inactive interval on the system, avoiding the continued application of pulses to the lamp. Experimentation has disclosed that an active interval including a sequence of fast rise-time, high voltage, limited energy oscillatory pulses and lasting for between about 0.25 seconds and about 1 second is preferably followed by an inactive interval of between about 0.5 seconds and about 2.5 seconds for optimum HPS lamp hot restarting performance. The preferred values for these active and inactive intervals are 0.67 seconds and 1.5 seconds, respectively. Thus, timer circuit 22 performs the function of imposing this inactive interval on the pulse circuit by opening switch 20 at the end of the first predetermined interval of pulse production. At the conclusion of the 0.5 to 2.5 second inactive interval, timer circuit 22 again closes switch 20 and allows the pulse circuit 12 to again supply high voltage pulses to lamp 10. If, again, ignition does not take place, this sequence of active and inactive intervals is repeated.

It is important that each active period have a length which is long enough to sufficiently ionize the lamp plasma to force its instantaneous impedance to drop down to a level at which higher magnitudes of current can be forced through the lamp by the available voltage and force it into a higher ionization level. However, the interval cannot be so long that it adds significant heating to the arc tube and deionize gaseous components. Continuously applied high voltage energy stimulation tends to keep the arc tube and gas temperatures up, thus prolonging the time required to effect hot restarting with a practical system. The active period causes a complex sequence of ionization events to occur within the lamp. The details of this sequence are not fully understood, however, it has been clearly established that the sequence of a 0.67 second active interval followed by a 1.5 second inactive interval is optimum for a high pressure sodium lamp.

The inactive interval, in addition to allowing the lamp to recover and to be in a better condition for starting, also allows high voltage circuit points which may have ionized or even arced-over to be deenergized (quenched) and also allows for the dissipation of any ozone generated by the high voltages in the fixture. These various advantages mean that optimum lamp starting properties can be built into a smaller device (including the fixture) while minimizing the electrical and chemical stress placed on the dielectric system.

The circuit thus far described without resistor 26 and repeat timer 28 can be designed so that the pulse interval timer circuit does not allow a second burst of oscillations from the pulse circuit by choosing the time constants such that switch 20 will be latched open until the circuit is reset i.e., until the power source is deenergized and reenergized, and by selecting the open circuit voltage of the ballast reactor higher than the lamp operating voltage.

However, a preferred form of the circuit permits the repetitive sequencing of pulses from circuit 12 for a predetermined interval of time or number of cycles of active and inactive intervals after which, if ignition of lamp 10 has not yet occurred, the pulse system is deactivated until the power supply is recycled. This is accomplished by NTC resistor 26 and timer 28. As current flows through resistor 25 to pulse interval timer circuit 22, resistor 26 is heated. After a predetermined number of cycles of pulse circuit 12, the temperature of resistor 26 is elevated to a point at which its resistance is low enough to deactivate timer 28, turning off timer circuit 22 and holding the system in that state until reset when the power supply is turned off and on again.

Figure 2:
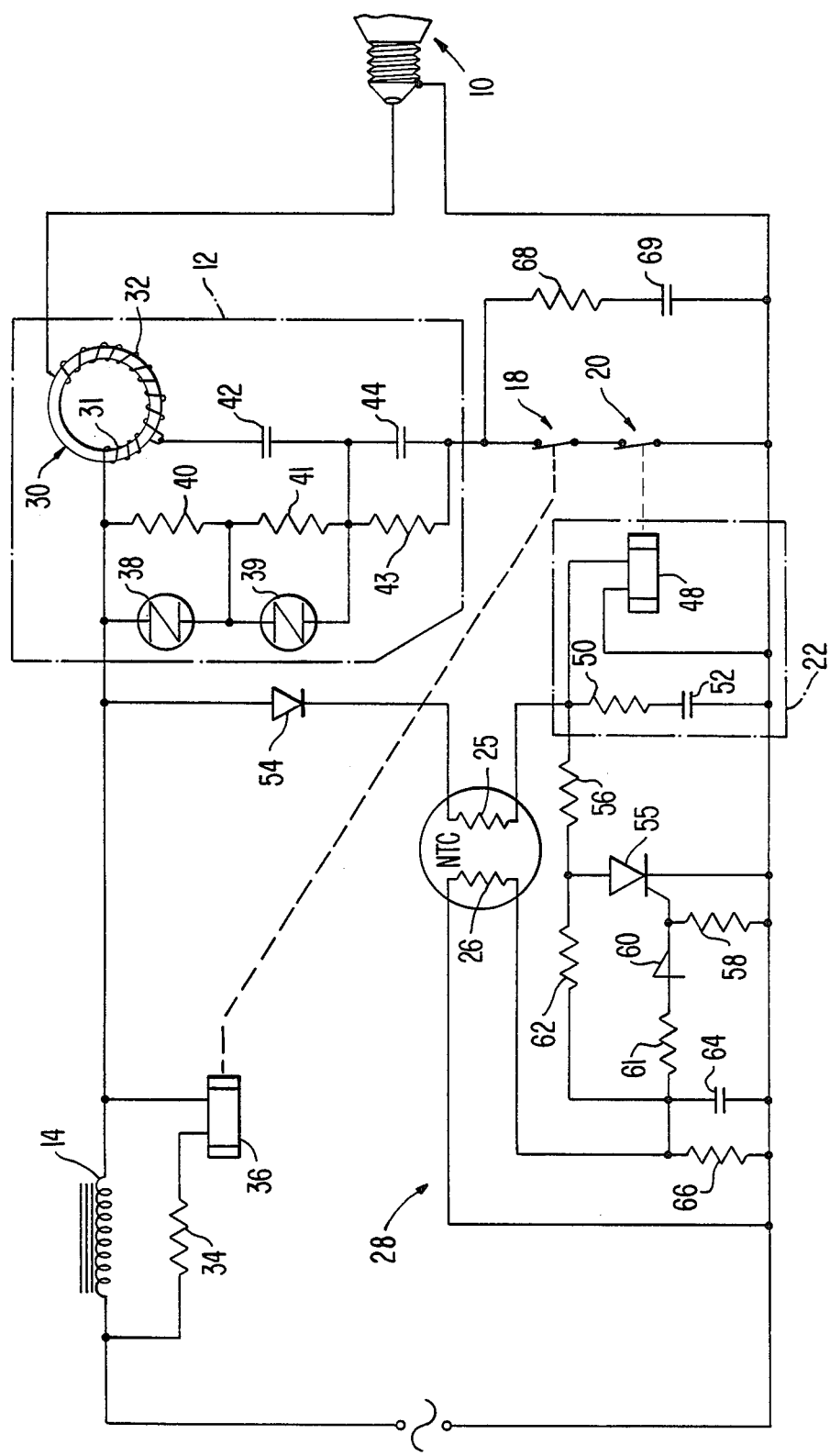
FIG. 2 is a schematic circuit diagram showing the circuit of FIG. 1 in greater detail.

The manner in which this operation can be accomplished is illustrated in the more detailed schematic diagram of FIG. 2. As shown therein, the center contact of a socket for lamp 10 is connected to the output of a pulse transformer 30 which is preferably a toroidal transformer having a relatively small primary winding 31 and a relatively large secondary winding 32 with a turns ratio on the order of 4:200. The primary is connected to the load side of ballast 14 and voltage sensor 16 comprises a resistor 34 connected in series circuit relationship with the energizing winding 36 of a relay, the normally closed contact set or sets of which comprise switch 18. The pulse circuit further includes one or more 2-terminal semiconductor switches 38, 39, two SIDAC switches connected in series being chosen for this particular circuit application. Resistors 40 and 41 are connected in series with each other and in parallel with the SIDAC circuit with the midpoints of the two series circuits being connected to ensure proper breakdown voltage division.

The resistor-SIDAC circuit is connected in parallel with the primary winding 31 of the pulse transformer and a capacitor 42, this series-parallel pulse circuit being connected in series with a second capacitor 44 and the contact sets which form switches 18 and 20.

During operation, capacitor 42 is charged through the circuit including winding 31, capacitor 44 and switches 18 and 20 until it reaches the breakdown voltage of SIDACS 38, 39, about 240 volts, at which time the capacitor is discharged through the SIDACS, causing this voltage to be applied to the primary winding. The energy stored in capacitor 42 is transferred to the toroidal core of the pulse transformer and to the effective lamp system distributed capacitance, thereby developing oscillatory high frequency pulses across the lamp having a voltage magnitude in excess of 10 KV. It will be noted that the high voltage oscillatory energy circulates through the circuit including capacitors 42 and 44 and secondary winding 32, the tap between the windings being maintained at a relatively low voltage because the capacitors serve as a high frequency bypass for the high voltage energy. This protects the ballast and other electronic components from these high voltages.

The size of capacitor 42 is in the order of one microfarad and is selected, in conjunction with the breakdown level of the solid state switch used, to develop sufficient energy to overcome losses and to positively hot restart the lamp. The magnitude of capacitor 44 is selected to ensure placement of the high voltage pulses on the front portion of the ballast open circuit voltage waveform as it produces a leading charging current and to develop the desired number of these high voltage pulses per half cycle. The pulses are then placed on each half cycle of the 60 Hertz open circuit voltage.

Timer circuit 22 includes the energizing winding 48 of an electromagnetic relay which controls contact set 20, the winding being connected in parallel circuit relationship with a resistor 50 and a capacitor 52. This parallel circuit is connected in series with heating resistor 25 and a semiconductor diode 54. Capacitor 52 is charged through the diode resistance circuit until the capacitor voltage reaches the energizing voltage of winding 48 at which time the relay energizes to open switch 20, terminating the operation of pulse circuit 12. A 24 volt DC relay is suitable for this purpose, and the value of resistance 25 is chosen so that the active pulsing interval is the appropriate length.

The repeat timer circuit includes an SCR 55 which is connected through a resistor 56 to timer circuit 22. The gate electrode of the SCR is connected through a resistor 58 to the return side of the line. The gate is also connected through a breakdown device 60 in series with a resistor 61 to a series circuit including a resistor 62 and a capacitor 64. A resistor 66 is in parallel with capacitor 64 and in parallel with NTC resistor 26 to provide an upper resistance limit across capacitor 64 to establish a definite transfer point.

This SCR circuit forces periodic discharge of capacitor 52, thus causing the active production of pulses to occur after a predetermined inactive period. Resistor 62, along with relatively small resistor 56, constitutes a charging circuit for capacitor 64. When the DC voltage level across capacitor 64 reaches the breakdown level of breakdown device 60, the SCR is triggered into conduction, thus discharging relatively large capacitor 52 and causing the high voltage pulsing to recommence. The SCR is commutated by the action of the collapsing field of the relay winding which forces a burst of current through resistor 50, causing a momentary voltage reversal across the SCR.

Resistor 26, which can alternatively be formed as a temperature activated normally open switch, is connected in parallel with capacitor 64. When the resistance of resistor 26 is low enough, capacitor 64 is prevented from charging to the breakdown voltage of diode 60, thereby inhibiting the action of the SCR and preventing the reestablishment of pulse energy for lamp 10. Thus, if the lamp refuses to start or hot restart after a selected interval of minutes, the high voltage pulsing circuit is turned off until the power source is turned off and back on later. The interval of minutes is selectable by choosing the characteristics of resistor 25 and the value of resistor 26 and the thermal coupling therebetween.

A long thermal time constant is thus accurately and reliably obtained because, when the lamp ignites and goes into full ionization and hence full operation, thus clamping the open circuit voltage, the power available to heat resistor 25 is insufficient to elevate the temperature to the deactivating level of timer 28.

In the circuit of FIG. 2, a series circuit including a resistor 68 and capacitor 69 is connected in parallel with switches 18 and 20 to limit contact arcing. The values of the components in this circuit are also chosen to cause the operating lamp voltage reignition spike to be critically damped or overdamped, preventing lamp warm-up dropout or other instabilities from occurring.

Figure 3:
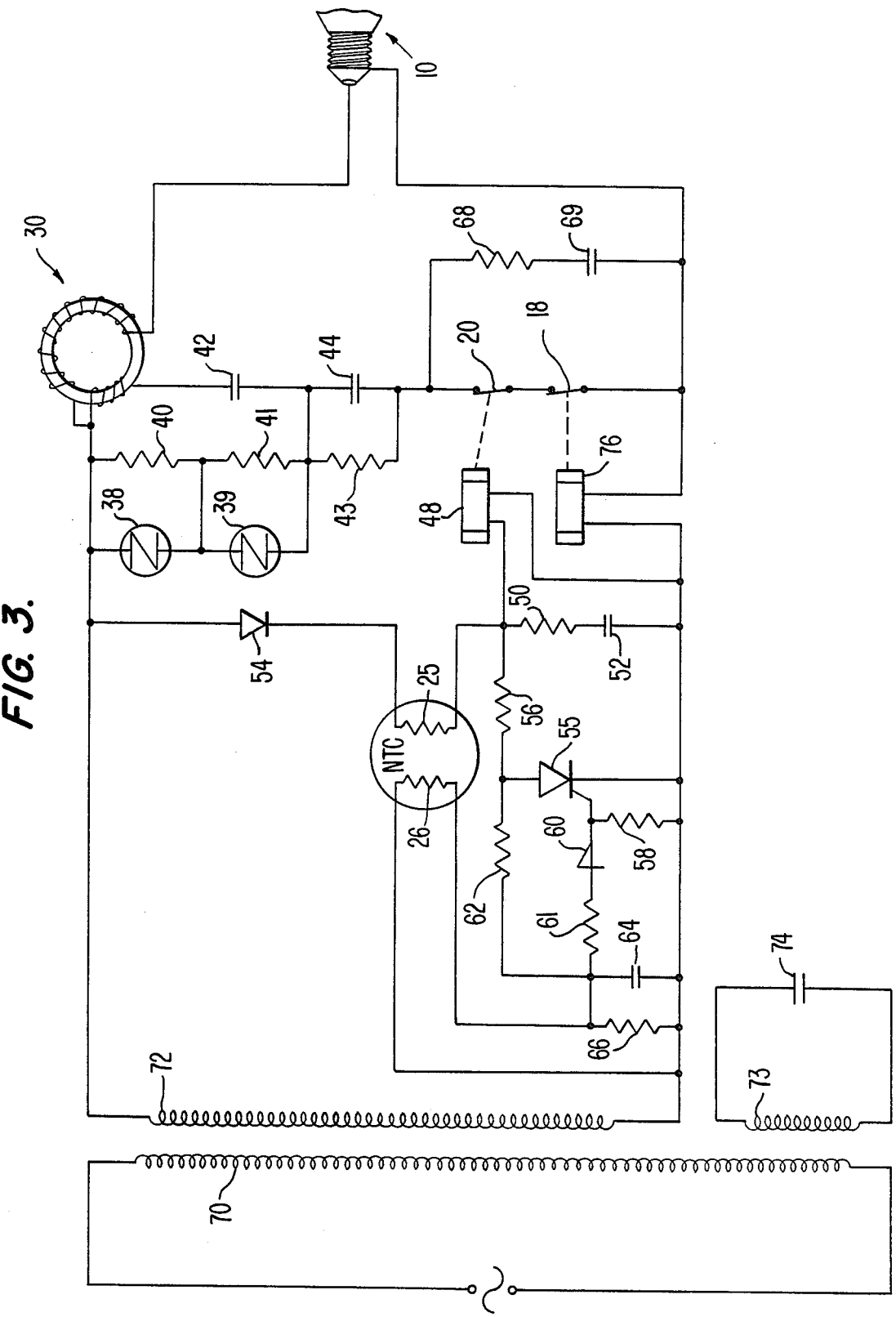
FIG. 3 is a schematic circuit diagram of a further embodiment of an apparatus in accordance with the invention usable with a ballast of the magnetic regulator type.

The circuit of FIG. 3 is very similar to that of FIG. 2 but is designed for use with a magnetic regulator having a primary winding 70, a secondary winding 72 which is connected to the pulsing circuit and the lamp, and a tertiary winding 73 having a capacitor 74 in parallel therewith. In this type of ballast circuit, the reactor voltage is difficult to sense. Accordingly, the voltage sensor including resistor 34 and relay winding 36 are eliminated and the energizing winding of a current sensitive relay 76 is connected in series in the lamp return line. Contact set 18 is thus operated by the current relay so that, when the lamp is operating and lamp current is flowing, relay 76 opens switch 18 to deactivate the pulse circuit. Otherwise, the operation of the embodiment of FIG. 3 is substantially the same as that of FIG. 2, the operation of the regulator itself being well understood and not being part of the present invention per se.

Figure 4:
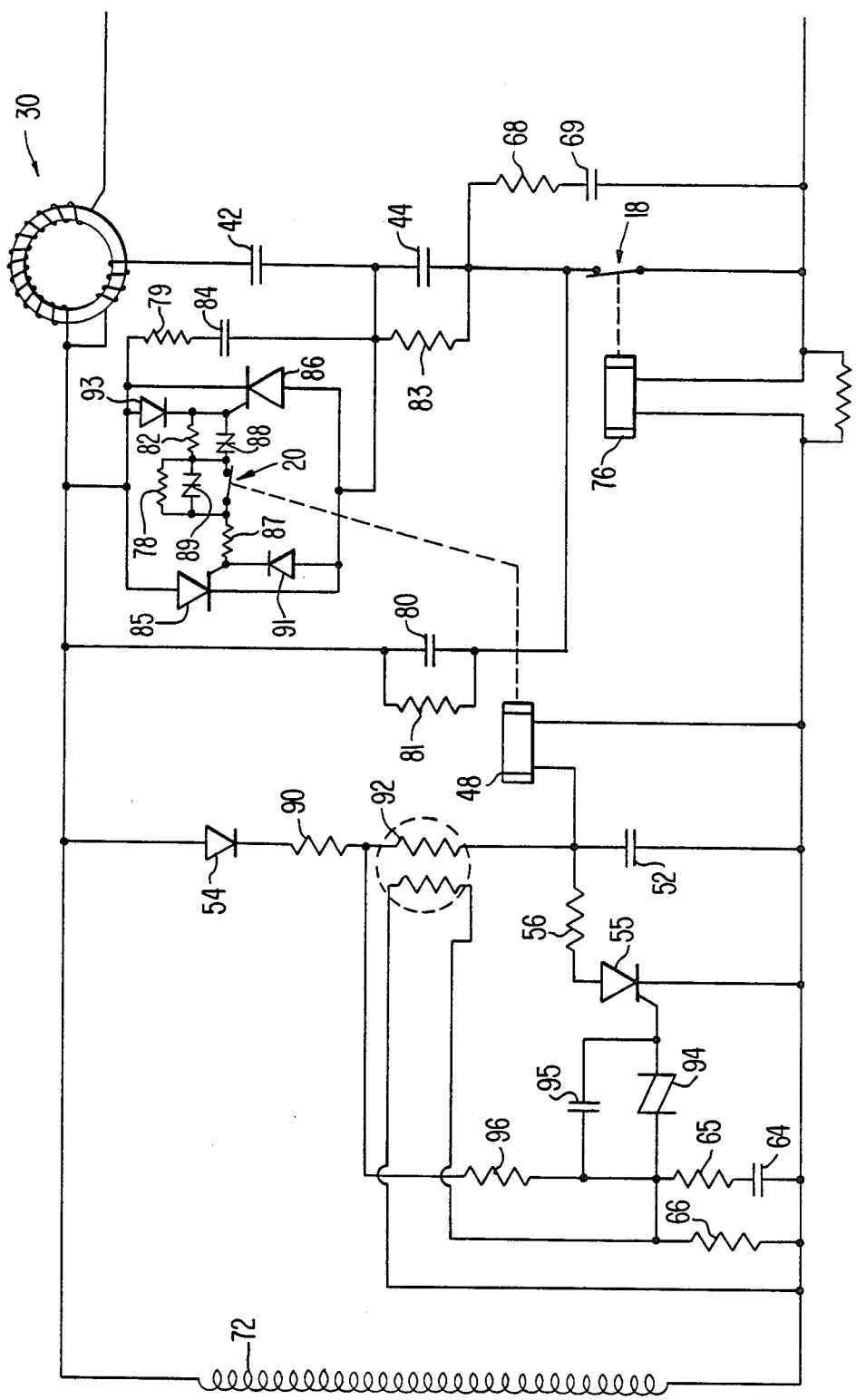
FIG. 4 is a schematic circuit diagram of a starting and operating circuit similar to that of FIG. 3 but with modified electronic circuit components.

The embodiment illustrated in FIG. 4 presents modifications usable in the circuits of the previous embodiments when employing a magnetic regulator, only the secondary 72 of which is shown in FIG. 4. Those portions of the circuit which are similar to those shown in the previous figures will not be described again.

A capacitor 80 is connected between the positive supply line from secondary 72 and the junction between switch contacts 20 and 18. A resistor 81 is connected in parallel with capacitor 80 to provide normal discharge when not in use. This capacitor is added to the circuit because of the open circuit voltage wave forms and to reduce the dynamic impedance characteristics as seen by the lamp looking back into the magnetic ballast. In those ballasts, there is insufficient instantaneous current available to provide "push-through" energy during hot restart. The capacitor corrects this problem, but must be eliminated from the circuit as soon as lamp operation is commenced because, if allowed to remain, it would destroy the normal lamp-ballast operational stability, performance and lamp electrode life. Opening switch 18 with the current relay 76 accomplishes this as soon as lamp operation commences.

The addition of capacitor 80, along with the magnetic regulator secondary characteristics, introduces a tendency of the entire circuit to oscillate in an undesirable fashion. Accordingly, a resistor 83 is connected in parallel circuit relationship with capacitor 44 to make the overall hot restart process more stable and positive. With the addition of this resistor, the size of capacitor 44 can be decreased since the resistor 83 carries a portion of the charging current for capacitor 42. It will be noted that resistor 83 is removed from the circuit by the opening of switch 18 or 20 except when it is needed. This prevents an increase in power loss during normal operation.

A further modification in this circuit is the inclusion of SCR's 85 and 86 in place of the SIDAC discharge circuit used in the embodiments of FIGS. 2 and 3. SCR 86 is connected in the reverse direction from SCR 85 and the gate electrodes of these devices are interconnected by a series circuit of a resistor 87 and a SIDAC 88. The circuit, as shown, behaves very much like the SIDAC circuit but is capable of handling much more switching energy.

The reason for this modification involves differences in the dynamic characteristics of the magnetic regulator ballast, the peak and RMS voltages of which are lower than the reactor open circuit voltage values. Because the regulator ballast delivers less total energy, it was necessary to increase the amount of energy delivered in the high voltages pulses from pulse transformer 30 and capacitor 80.

The charging circuit for capacitor 52 and for the SCR 55 is different in that the charging circuit includes series resistors 90 and 92. Because the voltage waveform from secondary 72 is lower in magnitude, a longer time-constant circuit requires increased charging rate driving voltage and linearity to effectively and repeatedly trigger the SCR. The gate circuit is therefore modified to include an SBS breakdown device 94 connected in parallel circuit relationship with a capacitor 95 and to a series resistor 96 the other end of which is connected between resistors 90 and 92. Capacitor 95 insures positive voltage breakdown of SBS 94. The operation of this circuit is essentially the same as previously described.

Figure 5:
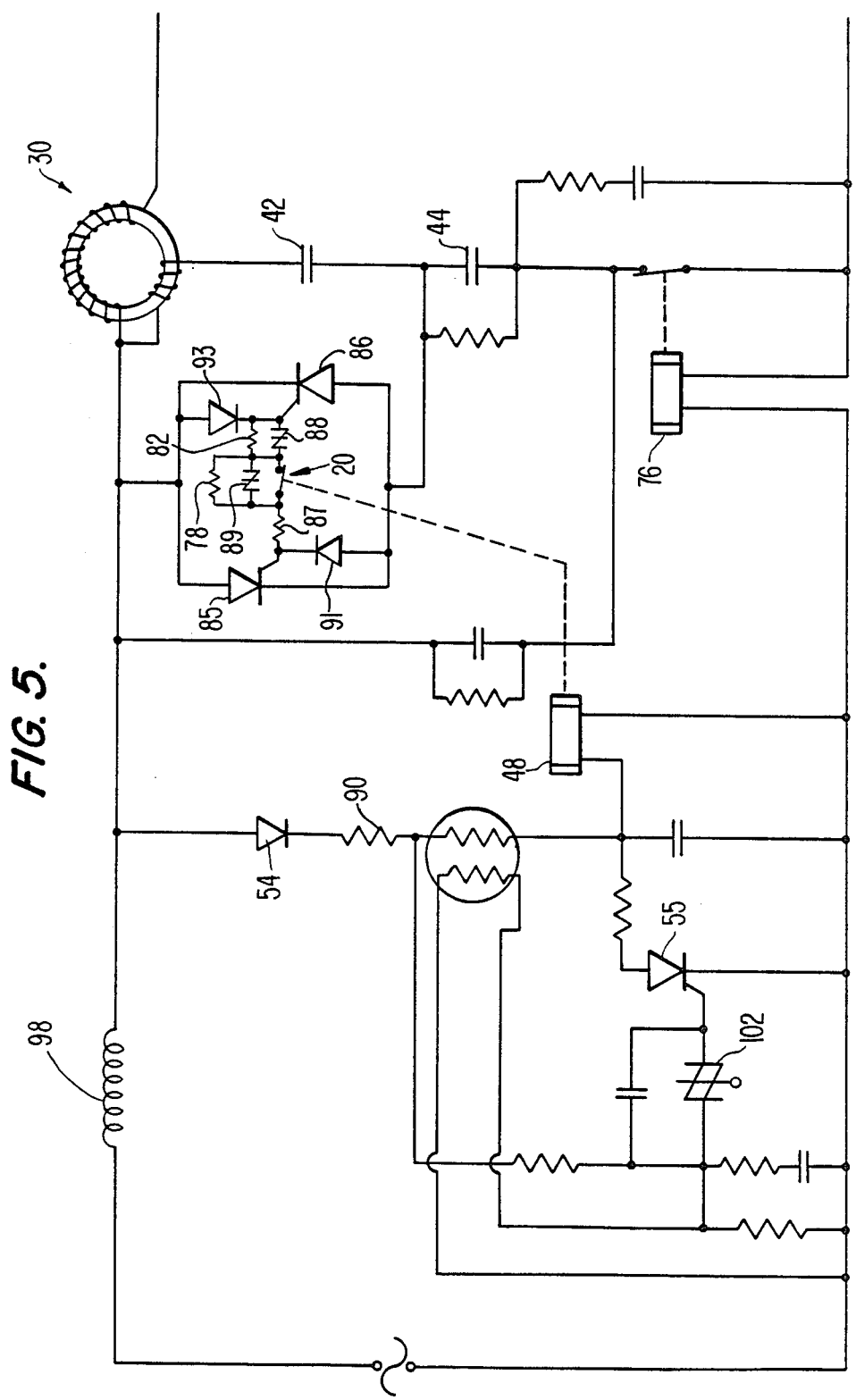
FIG. 5 is a schematic circuit diagram of a further embodiment in accordance with the invention showing circuit components specifically intended for use with certain high pressure sodium reactor or lag ballasts.

FIG. 5 illustrates the circuit for an embodiment which is quite similar to that of FIG. 4 but is designed for use with a reactor ballast 98. The major differences from FIG. 4 are in circuit values and in the incorporation of gate diodes 100 and 101 in the SCR trigger circuit. Also, an SUS breakdown device 102 is included in the gate circuit for SCR 55. The circuit shown in FIG. 5 is particularly useful in connection with a 250 watt, 100 volt HPS lamp.

Figure 6:
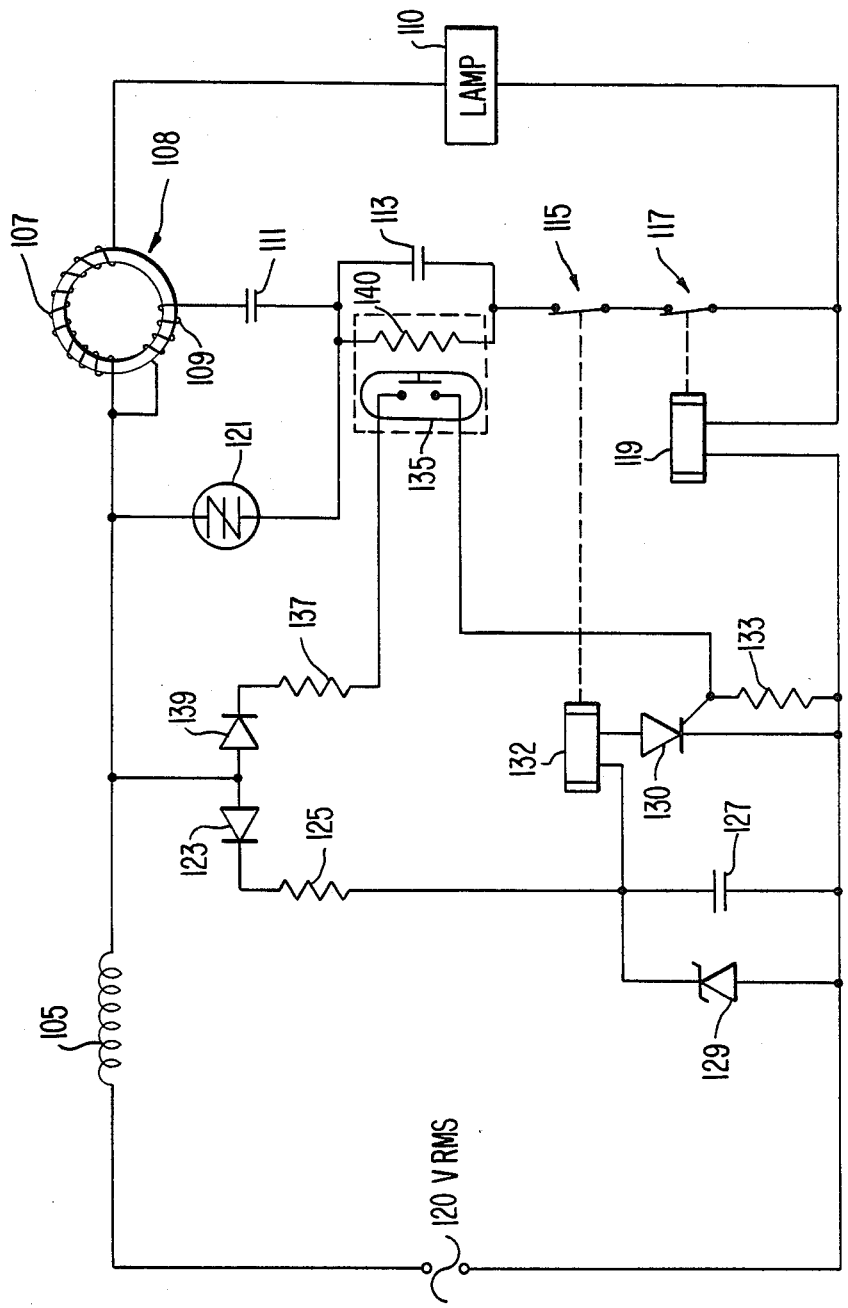
FIG. 6 is a schematic circuit diagram of another embodiment of the invention for use with a lower voltage, lower wattage lamp than the circuit of FIG. 5.

FIG. 6 illustrates an embodiment which is usable with the 150 watt, 55 volt HPS lamp. It will be noticed that the circuitry is considerably less complex because the 55 volt lamp types are somewhat easier to start and restart than, for example, the 250 watt, 100 volt lamps. The circuit of FIG. 6 includes a ballast reactor 105 connected to the AC supply line and to a secondary winding 107 of pulse transformer 108. The primary winding 109 is connected between the hot line and a capacitor 111 which is the primary energy storage capacitor for the pulse circuit. A capacitor 113 and two sets of normally closed contacts 115 and 117 are connected between capacitor 111 and the return side of the AC supply. Lamp 110 is connected between the secondary winding and the return side in parallel with the capacitor-switch circuit. The energizing winding of a current-sensitive relay 119 is connected in series in the return line and mechanically operates contact set 117. A SIDAC 121 is connected between the high side of the supply line and the junction between capacitors 111 and 113.

A diode 123, resistor 125 and capacitor 127 are connected in series between the supply and return lines, a Zener diode 129 being connected in parallel with capacitor 127. An SCR 130 is connected in series with the energizing winding of a relay 132, this series circuit also being in parallel with capacitor 127. Relay 132 operates contact set 115. The gate electrode of SCR 130 is connected through a resistor 133 to the return side and also through a normally open contact of a thermally operated switch 135 to the series circuit including a resistor 137 and diode 139. A heater resistor 140 is connected in parallel with capacitor 113 and is in good heat transfer relationship with switch 135 so that when resistor 140 has been sufficiently heated, the contacts of the thermally actuated switch are closed.

The operation of this circuit is somewhat similar to those discussed before but there are certain operational differences. The pulse circuit operates in essentially the same fashion in that when the lamp has been extinguished or has not yet been started the voltage delivered through reactor 105 is applied to the pulse circuit with relays 119 and 132 being deenergized and contact sets 115 and 117 closed. Capacitor 111 charges until the breakdown level of SIDAC 121 is reached at which time the capacitor discharges through primary winding 109, producing oscillatory energy at a high voltage level across lamp 110. When lamp 110 ignites, the operating current energizes relay 119, opening contact set 117 and deactivating the pulse circuit.

Because this circuit is subjected to lower voltages, the supply for this circuit being 120 volts RMS, it is possible to allow the pulsing circuit to run for a longer interval. However, if the lamp does not ignite after a predetermined interval in the order of 2-3 minutes, resistor 140 is heated sufficiently to close the contacts of switch 135, thereby providing a triggering voltage to the gate of SCR 130 which becomes conductive and energizes relay 132, opening contact set 115. The energized relay is latched on by capacitor 127 even though switch 135 opens after resistor 140 cools down as a result of open contact set 115. The system remains in this state until the power source is turned off and then back on again.

Figure 7:
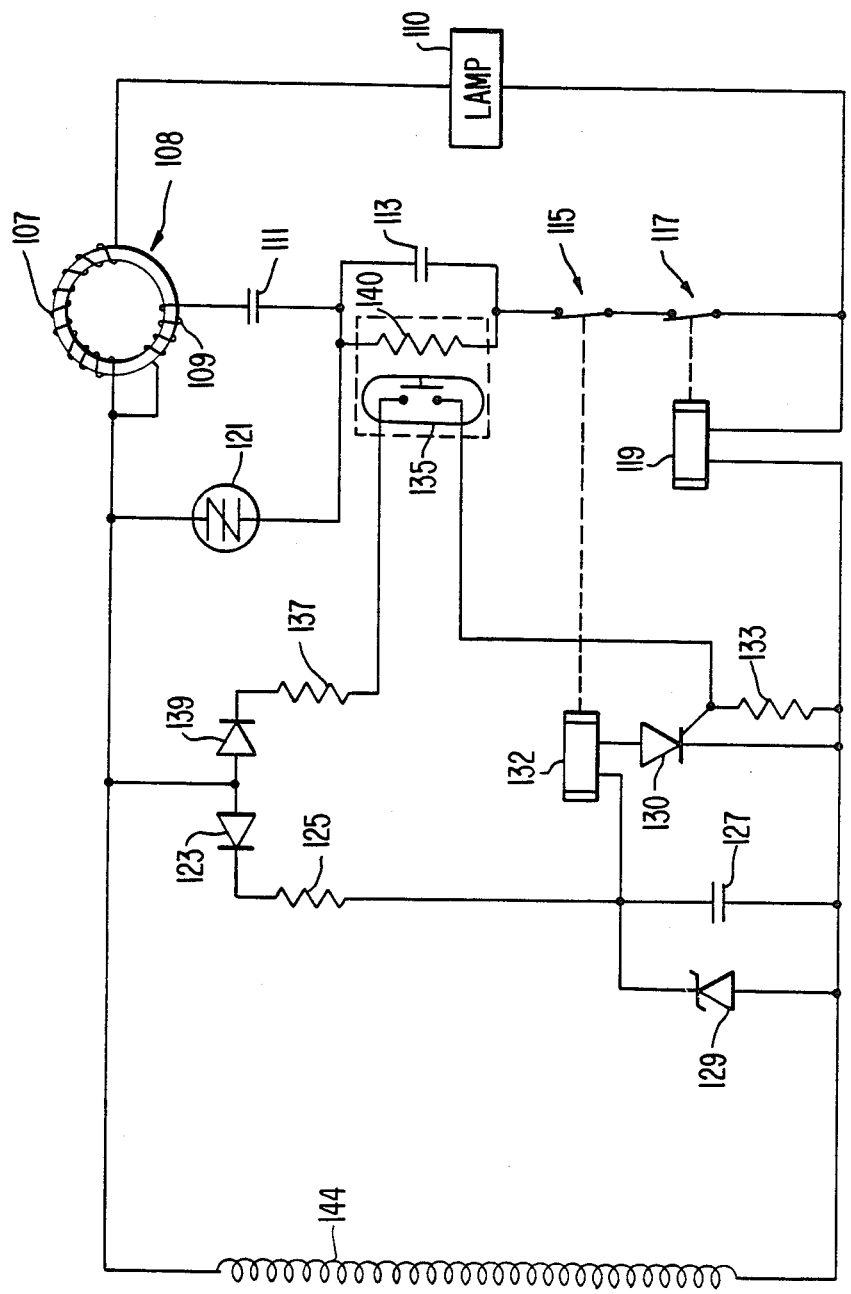
FIG. 7 is a schematic circuit diagram of yet another embodiment in accordance with the invention for use with a magnetic regulator ballast circuit.

The circuit of FIG. 7 is the same as the circuit of FIG. 6 except that reactor 105 is omitted and the system is energized by a magnetic regulator ballast, only the secondary winding 144 of which is shown. The operation of the circuit is otherwise the same and will not be repeated.

Figure 8:
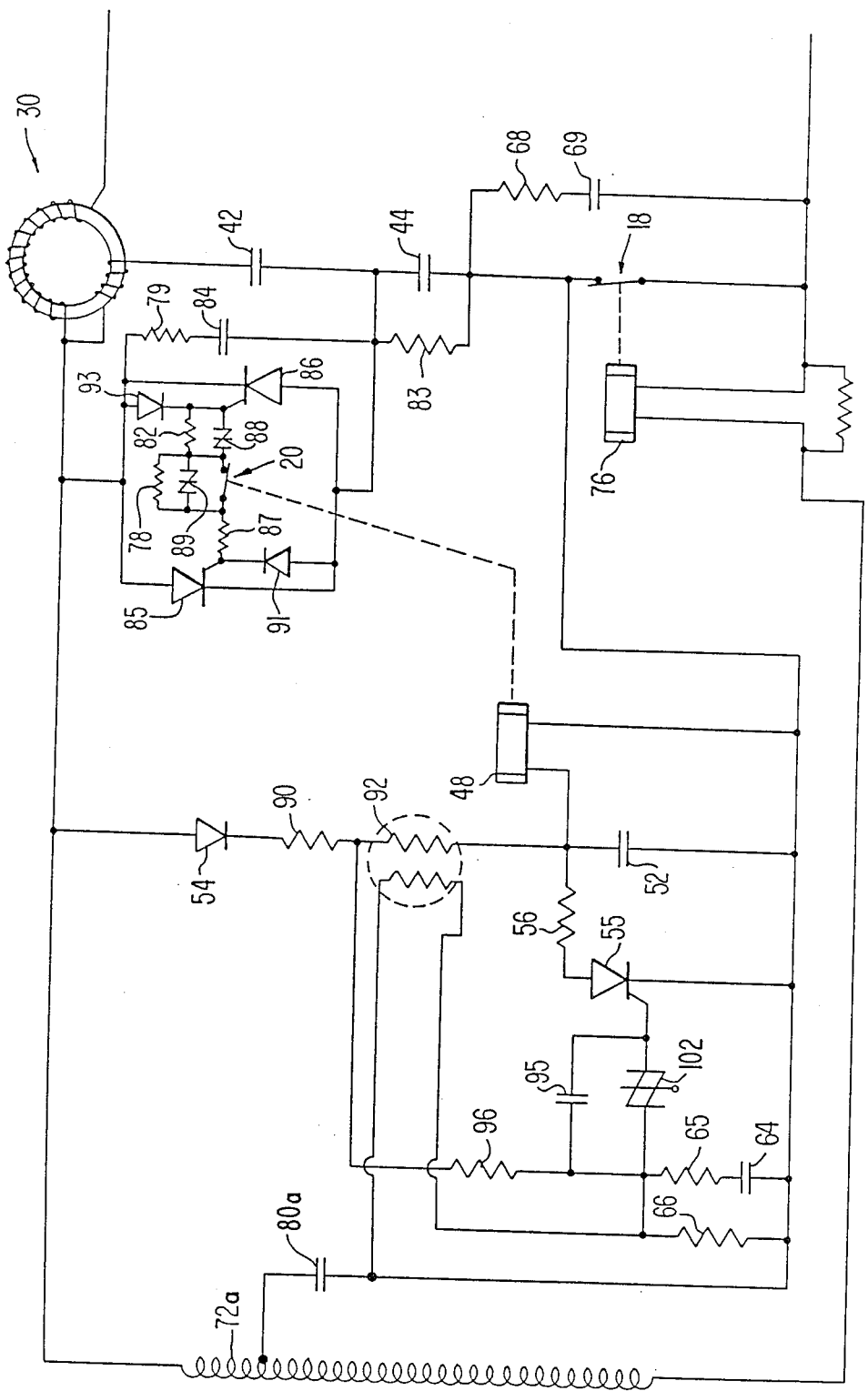
FIG. 8 is a schematic circuit diagram of a further improved circuit for use with a magnetic reactor ballast circuit.

FIG. 8 shows a circuit which is an improvement over that shown in FIG. 4. Although the actual circuit changes from FIG. 4 are rather small, the improvement in efficiency and in operating effectiveness is substantial.

First, a tap is provided near the upper "finish" end of ballast transformer secondary winding 72A and one side of capacitor 80a is connected to that tap. The other side of capacitor 80a is connected to the common line of the timing circuits. However, that common line is now separated from the lamp and ballast common line and is connected to the switched side of contact set 18 so that, when the lamp is operating and relay winding 76 is energized, the timing circuits are totally deenergized.

The move of capacitor 80a to the ballast secondary tap allows the capacitor to act as a source of intermediate energy or secondary source of driving current for the ignition burst. It has the beneficial effect of modifying the high voltage pulse so that instead of the pulse having as high a high peak, the energy is distributed over a wider interval at a lower peak level. This provides a high lamp ionization level and thus a lower lamp dynamic impedance state. Experiments have indicated that this is effective to hot-restart a wider variety of lamp sizes while reducing the peak voltage applied to the lamp, a substantial advantage in lengthening lamp life and reducing failures.

In the operation of this starting circuit, capacitor 42 is the primary energy storage device operating in conjunction with the smaller pulse transformer winding to supply a burst of high voltage energy to the lamp. If that initial burst fails to cause the lamp to ignite, the burst is followed by a further burst from capacitor 80a which can be thought of as "push-through" energy to force complete ionization. Connection of this intermediate energy capacitor to a tap on the ballast winding allows increased magnitudes of energy to be delivered to the lamp without destructive high currents being generated. In fact, the size of capacitor 80a can be reduced from 12 to 3 microfarads with increased operational effectiveness.

The relationship between the current applied to the lamp and the state of the lamp during starting, particularly hot restarting, is important to understand because the method employed is primarily a current-oriented, rather than a voltage-oriented, approach to the problem. Energy is applied to the lamp in three rather distinct forms or phases, the first being pulses of a relatively high voltage, on the order of 10 KV, superimposed on both half cycles of the open-circuit 60 Hz AC waveform. Because this occurs during both half-cycles of the waveform, the effect is the application of pulses at a 120 Hz rate. In the particular embodiments shown, the pulses are similar to four or five cycles of a damped oscillatory wave.

If they are successful in commencing ignition, these pulses initially establish a "streamer" arc between the electrodes of the lamp which tends to follow the interior wall of the glass envelope of the lamp. This arc must be converted into a direct thermal arc which extends directly between the electrodes. The establishment of the streamer arc causes a lowering of the internal lamp impedance. The starting circuit of the invention presents a low impedance as seen by the lamp, in the order of 50-100 Ohms. At this stage, a second burst of energy is provided by the discharge of capacitor 80a which causes high current flow to the lamp in the order of 10-20 amperes. The effect of this current flow is to push the lamp into full ionization, essentially causing the streamer arc to be blown into a full, electrode-stabilized thermal arc.

The lamp at this stage is in an ionized, low-internal-impedance state in which the arc can be maintained by the normal operating AC current supplied by the ballast, the third and final form of energy applied to the lamp until operation of the lamp is again interrupted.

As indicated above, moving the common line to the switched side of contact set 18 guarantees that the timing and pulsing circuits are turned off without relying on the clamping effect of the HID lamp operating voltage which varies.

Figure 9:
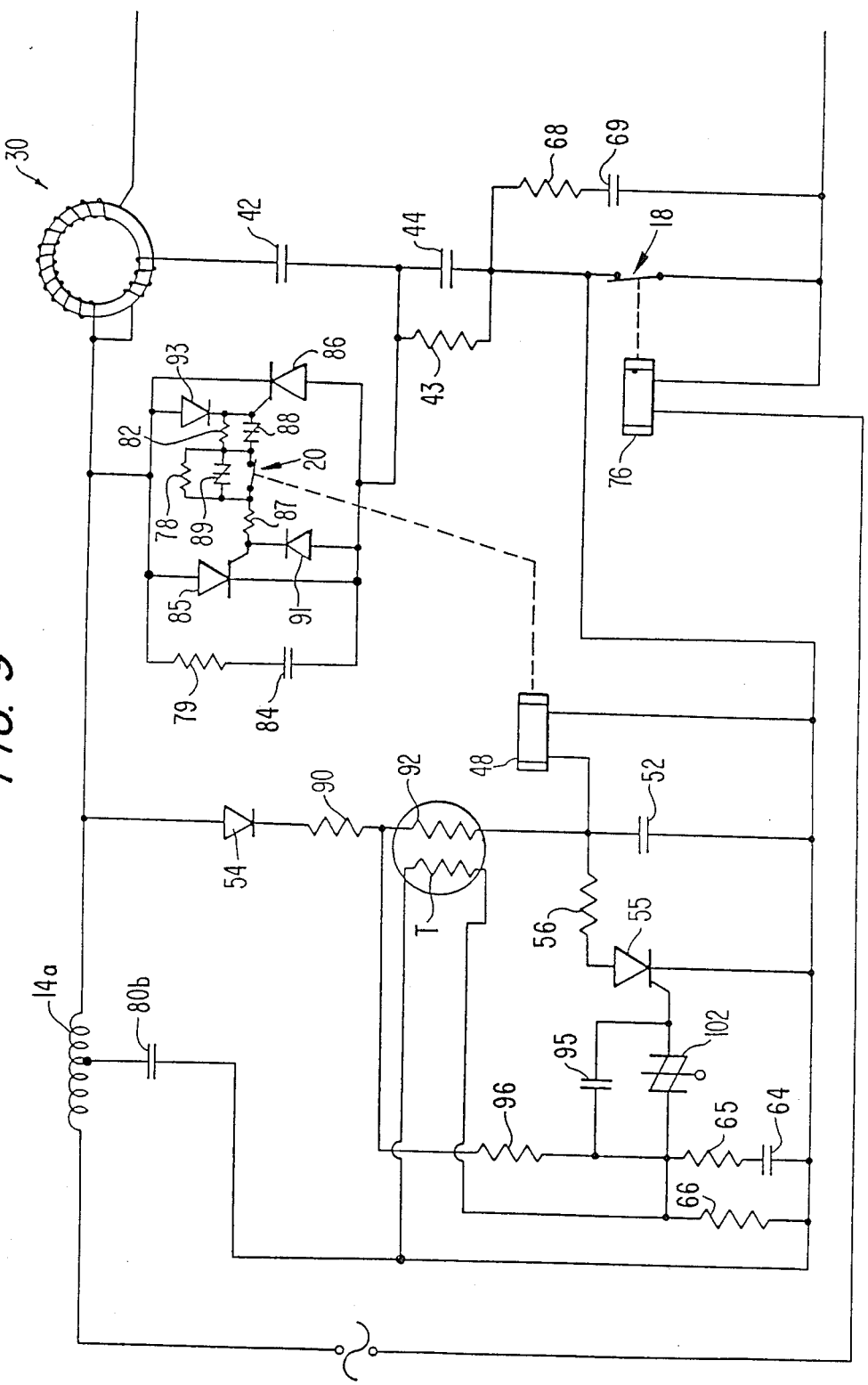
FIG. 9 is a schematic circuit diagram of a circuit similar to FIG. 8 for use with a series reactor ballast.

FIG. 9 shows the same modifications made to a circuit of the type showing FIG. 5 which uses a series ballast reactor 14a. Ballast 14a is provided with a tap to which capacitor 80b is connected. Also, as with FIG. 8, the common line for the pulse and timing circuits is separated from the lamp common line and connected to the switched side of contact set 18. The operational improvements are the same as those discussed in connection with FIG. 8.

Following is a tabulation of various component values for the circuits discussed.

TABLE 1
COMPONENT VALUES, FIG. 2
Transformer 30 turns ratio, 4:200

| | | |
|---|---|---|
| Capacitor 42 | 1.5 | mfd |
| Capacitor 44 | 4 | mfd |
| Capacitor 52 | 1000 | mfd |
| Capacitor 64 | 100 | mfd |
| Capacitor 69 | 0.22 | mfd |
| Resistor 25 | 5 K | Ohms |
| Resistor 26 | 90 K Ohms at cutoff | |
| Resistor 40 | 100 K | Ohms |
| Resistor 41 | 100 K | Ohms |
| Resistor 43 | 100 K | Ohms |
| Resistor 50 | 270 | Ohms |
| Resistor 56 | 100 | Ohms |
| Resistor 58 | 1 K | Ohms |
| Resistor 61 | 470 | Ohms |
| Resistor 62 | 150 K | Ohms |
| Resistor 66 | 470 K | Ohms |
| Resistor 68 | 470 | Ohms |

TABLE 2
COMPONENT VALUES, FIG. 3

| | | |
|---|---|---|
| Capacitor 42 | 1.5 | mfd |
| Capacitor 44 | 5 | mfd |
| Capacitor 52 | 1200 | mfd |
| Capacitor 64 | 100 | mfd |
| Capacitor 69 | 0.22 | mfd |
| Resistor 25 | 5 K | Ohms |
| Resistor 40 | 100 K | Ohms |
| Resistor 41 | 100 K | Ohms |
| Resistor 43 | 100 K | Ohms |
| Resistor 50 | 270 | Ohms |
| Resistor 56 | 100 | Ohms |
| Resistor 58 | 1 K | Ohms |
| Resistor 61 | 470 | Ohms |
| Resistor 66 | 470 K | Ohms |
| Resistor 68 | 470 | Ohms |

TABLE 3
COMPONENT VALUES, FIG. 4

| | | |
|---|---|---|
| Capacitor 42 | 2.7 | mfd |
| Capacitor 44 | 4.0 | mfd |
| Capacitor 52 | 560 | mfd |
| Capacitor 64 | 50 | mfd |
| Capacitor 69 | 0.22 | mfd |
| Capacitor 80 | 3.9 | mfd |
| Capacitor 95 | 100 | mmfd |
| Resistor 56 | 27 | Ohms |
| Resistor 65 | 100 | Ohms |
| Resistor 66 | 470 K | Ohms |
| Resistor 68 | 470 | Ohms |
| Resistor 81 | 470 K | Ohms |
| (Resistor) | | (Ohms) |
| (Resistor) 83 | 300 | (Ohms) |
| (Resistor) 87 | 470 | (Ohms) |
| (Resistor) 90 | 2.5 K | (Ohms) |
| (Resistor) 92 | 2.5 K | (Ohms) |
| (Resistor) 96 | 330 K | (Ohms) |

TABLE 4
COMPONENT VALUES, FIG. 5
Transformer 30 turns ratio 7:200

| | | |
|---|---|---|
| Capacitor 42 | 1.5 | mfd |
| Capacitor 44 | 8 | mfd |
| Capacitor 52 | 560 | mfd |
| Capacitor 64 | 50 | mfd |
| Capacitor 69 | 0.22 | mfd |
| Capacitor 80 | 2 | mfd |
| Capacitor 95 | 100 | pf |
| Resistor 56 | 27 | Ohms |
| Resistor 65 | 100 | Ohms |
| Resistor 66 | 470 K | Ohms |
| Resistor 68 | 470 | Ohms |
| Resistor 81 | 470 K | Ohms |
| Resistor 83 | 300 | Ohms |
| Resistor 87 | 470 | Ohms |
| Resistor 90 | 2.5 K | Ohms |
| Resistor 92 | 2.5 K | Ohms |
| Resistor 96 | 330 K | Ohms |

TABLE 5
COMPONENT VALUES, FIG. 6
Transformer 30 turns ratio 4:200

| | | |
|---|---|---|
| Capacitor 111 | 2.7 | mfd |
| Capacitor 113 | 6 | mfd |
| Capacitor 127 | 1200 | mfd |
| Resistor 125 | 2.5 K | Ohms |
| Resistor 133 | 470 | Ohms |
| Resistor 137 | 4.7 K | Ohms |
| Resistor 140 | 500 | Ohms |

TABLE 6
COMPONENT VALUES, FIG. 7

| | | |
|---|---|---|
| Capacitor 113 | 6.8 | mfd |

TABLE 7
COMPONENT VALUES, FIGS. 8 and 9

| | | |
|---|---|---|
| Resistor 43 | 300 | ohms |
| Resistor 56 | 27 | ohms |
| Resistor 65 | 100 | ohms |
| Resistor 66 | 470 K | ohms |
| Resistor 68 | 470 | ohms |
| Resistor 79 | 22 | ohms |
| Resistor 90 | 2500 | ohms |
| Resistor 92 | 2500 | ohms |
| Resistor 96 | 330 K | ohms |
| Capacitor 42 | 2.0 | microfarad |
| Capacitor 44 | 8.0 | microfarad |
| Capacitor 52 | 560 | microfarad |
| Capacitor 64 | 50 | microfarad |
| Capacitor 69 | 0.22 | microfarad |
| Capacitor 80a | 3 | microfarad |
| Capacitor 80b | 3 | microfarad |
| Capacitor 84 | 0.22 | microfarad |
| Capacitor 95 | 100e(−3) | microfarad |
| Diode | 54 | GP15G |
| Diode | 91 | GP15G |
| Diode | 93 | GP15G |
| Bidir. Sw. | 102 | MBS4992 |
| | 55 | 2N4443 SCR |
| | 85 | MCR69-6 SCR |
| | 86 | MCR69-6 SCR |
| Sidac | 88 | MKP9V240 |
| Sidac | 89 | MKP9V240 |
| Thermistor | T | 4H205, NTC |

While certain advantageous embodiments have been chosen to illustrate the invention, it will be understood by those skilled in the art that various changes and modifications can be made therein without departing from the scope of the invention as defined in the appended claims.

What is claimed is:

1. A starting and operating circuit for a high intensity discharge lamp comprising the combination of
   an AC voltage source;
   lamp ballast means having an input connected to said source and having an AC output;
   a controlled high-voltage lamp pulsing circuit means connected between said AC output of said ballast means and said lamp for applying to said lamp a series of high voltage pulses having peak voltages significantly greater than the normal lamp starting and operating voltage magnitudes;
   first circuit means for terminating said series of pulses after a first predetermined active interval in the absence of lamp ignition and for suspending the application of high voltage pulses to said lamp for a second or quiet interval and for allowing said lamp pulsing circuit means to again apply high voltage pulses to said lamp at the end of said second interval;
   second circuit means for terminating application of said high voltage pulses to said lamp after the lamp completely ignites; and
   third circuit means for terminating application of said high voltage pulses to said lamp after a predetermined number of active and quiet intervals without ignition until said AC source is turned off and back on to reset said starting and operating circuit.

2. A circuit according to claim 1 wherein said first circuit means includes a pulse transformer having a toroidal core, a secondary winding connected to said lamp and to said ballast means, a primary winding, a capacitor connected in series with said primary winding and a solid state switch connected in parallel with the series circuit including said capacitor and primary winding.

3. A circuit according to claim 2 wherein said first circuit means includes a normally conductive controllable switch means connected in series with said lamp pulsing circuit means so that opening said switch means deactivates said first circuit means, and
   timing means connected to said AC source for opening said switch means after said first predetermined active interval to suspend application of said pulses.

4. A circuit according to claim 3 wherein said timing means includes a resistor, a diode and a capacitor connected in series across said output of said ballast means and also to said switch means.

5. A circuit according to claim 4 wherein said controllable switch means includes a relay having a normally closed contact set and an energizing winding connected across said capacitor thereby making said switch means responsive to said resistor in said resistor-diode-capacitor circuit.

6. A circuit according to claim 4 wherein said first circuit means further includes means for rapidly discharging said capacitor at the end of said quiet interval to reclose said switch means.

7. A circuit according to claim 6 wherein said means for discharging includes a triggerable semiconductor switch connected in parallel with said capacitor and a gating circuit having a time constant for establishing the duration of said quiet interval.

8. A circuit according to claim 7 wherein said second circuit means includes a heating resistor connected across said AC source and a negative temperature coefficient resistor thermally coupled to said heating resistor and connected to said gating circuit, the resistance of said NTC resistor being reduced after an interval of heating to a value at which said gating circuit becomes inoperative.

9. A circuit according to claim 4 wherein said second circuit means includes a heating element and means thermally responsive thereto for keeping said switch means open.

10. A method of quickly restarting a hot high intensity discharge lamp which was operating and was then extinguished by a temporary power interruption or the like including the steps of
    generating a series of high voltage pulses having peak voltage magnitudes significantly greater than normal lamp operating voltage,
    applying the high voltage pulses to the lamp for a first active interval of predetermined length,
    suspending application of high voltage pulses to the lamp for a quiet interval of predetermined length if the lamp does not ignite as the result of the pulses applied during the first active interval,
    applying a series of the high voltage pulses to the lamp for a second active interval having the same length as the first active interval,
    repeating the suspension and application of pulses for a selected number of quiet and active intervals, absent lamp ignition; and
    terminating the application of pulses after the selected number of quiet and active intervals without ignition.

11. A method according to claim 10 wherein the magnitude of the high voltage pulses is at least 40 times the magnitude of the normal lamp operating voltage.

12. A method according to claim 11 wherein the duration of each active interval is between about 0.25 seconds and about 1.0 second and the duration of each quiet interval is between about 0.5 seconds and about 2.5 seconds.

13. A method according to claim 12 wherein the duration of each active interval is about 0.67 seconds and the duration of each quiet interval is about 1.5 seconds.

14. A method according to claim 10 wherein the duration of each active interval is between about 0.25 seconds and about 1.0 second and the duration of each quiet interval is between about 0.5 seconds and about 2.5 seconds.

15. A method according to claim 14 wherein the duration of each active interval is about 0.67 seconds and the duration of each quiet interval is about 1.5 seconds.

16. A method of quickly restarting a hot high intensity discharge lamp which was operating and was then extinguished by a temporary power interruption or the like including the steps of
    generating a series of high voltage pulses having peak voltage magnitudes significantly greater than normal lamp operating voltage,
    applying the high voltage pulses to the lamp for a first active interval of predetermined length to initiate a streamer arc in the lamp and, if the streamer arc is initiated, applying an intermediate level current pulse having a current magnitude greater than normal lamp operating current and a voltage in the order of magnitude of normal lamp operating voltage;
    suspending application of high voltage pulses to the lamp for a quiet interval of predetermined length if the streamer arc is not initiated as the result of the pulses applied during the first active interval, in the absence of arc initiation, applying a series of the high voltage pulses to the lamp for a second active interval having the same length as the first active interval, followed by another intermediate level current pulse, repeating the suspension and application of pulses for a selected number of quiet and active intervals, absent lamp ignition; and terminating the application of pulses after the selected number of quiet and active intervals without ignition.

17. A method according to claim 16 wherein the magnitude of the high voltage pulses is at least 40 times the magnitude of the normal lamp operating voltage.

18. A method according to claim 17 wherein the duration of each active interval is between about 0.25 seconds and about 1.0 second and the duration of each quiet interval is between about 0.5 seconds and about 2.5 seconds.

19. A method according to claim 18 wherein the duration of each active interval is about 0.67 seconds and the duration of each quiet interval is about 1.5 seconds.

* * * * *